US008316415B2

(12) United States Patent
Hwang

(10) Patent No.: US 8,316,415 B2
(45) Date of Patent: Nov. 20, 2012

(54) SECURITY DOCUMENT PRINTING SYSTEM AND METHOD OF CONTROLLING THE SAME

(75) Inventor: Tae Yoon Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1191 days.

(21) Appl. No.: 12/123,637

(22) Filed: May 20, 2008

(65) Prior Publication Data

US 2009/0037974 A1 Feb. 5, 2009

(30) Foreign Application Priority Data

Aug. 3, 2007 (KR) ........................ 10-2007-0078151

(51) Int. Cl.
*H04L 29/06* (2006.01)

(52) U.S. Cl. ................ 726/1; 713/176; 380/55; 283/72; 283/113; 358/3.28

(58) Field of Classification Search .................. 283/113; 358/3.28; 380/55
See application file for complete search history.

(56) References Cited

U.S. PATENT DOCUMENTS 4,891,666 A * 1/1990 Gordon ......................... 355/133
7,664,956 B2 * 2/2010 Goodman ..................... 713/176
2004/0179220 A1 * 9/2004 Van Oosterhout ........... 358/1.13
2004/0184065 A1 * 9/2004 Guan et al. .................... 358/1.14
2005/0052682 A1 * 3/2005 Ishikawa et al. ............. 358/1.14
2005/0071295 A1 3/2005 Cordery et al.
2008/0018942 A1 * 1/2008 Komiya ........................ 358/3.28
2010/0201114 A1 * 8/2010 Fields et al. .................... 283/70

FOREIGN PATENT DOCUMENTS

JP 2007-74078 3/2007

OTHER PUBLICATIONS

Eldefrawy et al., "Hardcopy Document Authentication Based on Public Key Encryption and 2D Barcodes", 2012, International Symposium on Biometrics and Security Technologies, pp. 77-81.*

KR Office Action issued Aug. 9, 2011 in KR Patent Application No. 10-2007-0078151.

* cited by examiner

*Primary Examiner* — Thanhnga B Truong
*Assistant Examiner* — Thaddeus Plecha
(74) *Attorney, Agent, or Firm* — Stanzione & Kim, LLP

(57) ABSTRACT

A system to print a security document and a control method thereof. The printing system simplifies a security procedure, and minimizes or prevents the security document from being illegally copied or copied without authorization. The printing system includes an input unit which receives an authenticator to copy the security document, and an output unit which determines whether the authenticator is equal to an authentication mark on the security document, and copies the security document in different ways according to the determined result.

37 Claims, 7 Drawing Sheets

SECURITY DOCUMENT PRINTING SYSTEM AND METHOD OF CONTROLLING THE SAME

CROSS-REFERENCE TO RELATED APPLICATIONS

This application claims priority under 35 U.S.C. §119(a) from Korean Patent Application No. 2007-0078151, filed on Aug. 3, 2007 in the Korean Intellectual Property Office, the disclosure of which is incorporated herein in its entirety by reference.

BACKGROUND OF THE INVENTION

1. Field of the Invention

The present general inventive concept relates to a system to print a security document, and more particularly, to a system to print a security document using an authentication of an administrator, and a control method thereof.

2. Description of the Related Art

Generally, with the increasing development of the information age and technology, the amount of information to be processed is also rapidly increasing, as is the importance of information security. Specifically, the importance of information security in enterprises or offices dealing with new technology or know-how is greatly increasing in recent times.

In order to prevent a security document from being illegally copied by other users other than authenticated users, a conventional copy system copies the security document upon receiving authentication information. In such conventional systems, a user is authenticated by a general authentication method. For example, if the user enters his or her ID and password, the printing system determines whether the entered ID and password indicate a valid user. If it is determined that the user is a valid user, the conventional system allows the security document to be copied.

Also, there is another conventional method for copying the security document using a watermark. If the security document that includes the watermark is illegally copied, the conventional system controls a specific character (e.g., "COPY" or "COPIED") to be shown as a white blank on the illegally-copied document, so that the user can recognize that the corresponding document is an illegally-copied document, and prevents the security document from being illegally copied.

Before performing the authentication process, a conventional method for printing the security document must typically pre-perform the process for receiving the authentication authority from the security administrator. Thus, the security procedure becomes complicated.

Also, in conventional systems, the user must typically copy the security document after receiving authentication information associated with the security document, resulting in greater inconvenience of use.

SUMMARY OF THE INVENTION

The present general inventive concept provides a printing system of a security document which simplifies a security procedure, and effectively prevents the security document from being illegally copied or copied without authorization, and a method of controlling the same.

Additional aspects and/or utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a system to print a security document, the system including an input unit which receives an authenticator from an administrator to copy the security document, and an output unit which determines a result of whether the authenticator is equal to an authentication mark on the security document, and copies the security document in different ways according to the determined result.

The foregoing and/or other aspects and utilities of the general inventive concept may also be achieved by providing a system to print a security document, the system including an input unit which receives an authenticator from an administrator to copy the security document, and an output unit which determines whether the authenticator is equal to an authentication mark on the security document, and does not print the security document if the authenticator is not equal to the authentication mark.

The system may further include a decision unit which determines whether the authenticator is equal to the authentication mark on the security document.

The system may further include a reader to read the authenticator and the authentication mark on the security document, wherein the decision unit determines whether the authenticator is equal to the authentication mark.

The system may further include a security-identifier generator which generates a security identifier.

The output unit of the system may print the security document if the authenticator is equal to the authentication mark.

The output unit of the system may print the security document along with the generated security identifier if the authenticator is equal to the authentication mark.

The output unit of the system may mask the security identifier when the authenticator is not equal to the authentication mark, and print the masked security identifier along with the security document.

The system may further include a display which displays a non-allowance message indicating a non-authentication state of the security document on a display if the authenticator is not equal to the authentication mark.

The foregoing and/or other aspects and utilities of the general inventive concept may also be achieved by providing a system to print a security document, the system including a generator which generates an authentication mark corresponding to a first authenticator, an output unit which displays the authentication mark on the security document while the security document is printed, and a decision unit which confirms the first authenticator by reading the authentication mark while the security document is copied, receives a second authenticator, compares the first authenticator with the second authenticator, and determines a result of whether the first authenticator is equal to the second authenticator, wherein the output unit prints the security document in different ways according to the determined result.

The foregoing and/or other aspects and utilities of the general inventive concept may also be achieved by providing a system to print a security document including a generator which generates an authentication mark corresponding to a first authenticator, an output unit which displays the authentication mark on a security document while the security document is printed, and a decision unit which confirms the first authenticator by reading the authentication mark while the security document is copied, receives a second authenticator, compares the first authenticator with the second authenticator, and determines whether the first authenticator is equal to the second authenticator, wherein the output unit prevents the security document from being printed when the first authenticator is not equal to the second authenticator.

The system may further include an input unit to receive an authenticator; and a reader for reading the authenticator and the authentication mark.

The system may further include a storage unit for storing the authenticator and the authentication mark corresponding to the authenticator.

The system may further include an authentication mark that is in the form of a barcode.

The system may further include a security-identifier generator which generates a security identifier.

The output unit of the system may further print the security document if the first authenticator is equal to the second authenticator.

The output unit of the system may further print the security document along with the generated security identifier if the first authenticator is equal to the second authenticator.

The output unit of the system may further mask the security identifier when the first authenticator is not equal to the second authenticator.

The system may further include a display which displays a non-allowance message indicating a non-authentication state of the security document on a display when the first authenticator is not equal to the second authenticator.

The foregoing and/or other aspects and utilities of the general inventive concept may also be achieved by providing a method of controlling a printing system of a security document including receiving an authenticator to copy the security document, and determining a result of whether the authenticator is equal to an authentication mark on the security document, and printing the security document in different ways according to the determined result.

The method may further include reading the authenticator and the authentication mark on the security document after receiving the authenticator, and determining whether the authenticator is equal to the read authentication mark.

The method may further include printing the security document if the authenticator is equal to the authentication mark.

The method may further include printing the security document along with the generated security identifier if the authenticator is equal to the authentication mark.

The method may further include preventing the security document from being printed if the authenticator is not equal to the authentication mark.

The method may further include displaying a non-allowance message indicating a non-authentication state of the security document on a display if the authenticator is not equal to the authentication mark.

The foregoing and/or other aspects and utilities of the general inventive concept may also be achieved by providing a method of controlling a printing system of a security document including generating an authentication mark corresponding to a first authenticator, displaying the authentication mark on the security document while the security document is printed, confirming the authenticator by reading the authentication mark while the security document is copied, receiving a second authenticator, comparing the first authenticator with the second authenticator, and determining a result of whether the first authenticator is equal to the second authenticator, and printing the security document in different ways according to the determined result.

The method may further include storing the authenticator and the authentication mark corresponding to the authenticator after generating the authentication mark.

The method may further include printing the security document if the first authenticator is equal to the second authenticator.

The method may further include printing the security document along with a pre-stored security identifier if the first authenticator is equal to the second authenticator.

The method may further include preventing the security document from being printed if the first authenticator is not equal to the second authenticator.

The method may further include displaying a non-allowance message indicating a non-authentication state of the security document on a display if the first authenticator is not equal to the second authenticator.

The foregoing and/or other aspects and utilities of the general inventive concept may also be achieved by providing a system to print a security document, the system including a reader to read a document, and an output unit to determine a printing process according to an authentication mark of the read document and a reference authenticator.

The printing process of the system may further include one of a first printing process to print the read document, a second printing process to print an image different from the read document, and a third printing process not to print the read document.

The foregoing and/or other aspects and utilities of the general inventive concept may also be achieved by providing a system to print a security document, the system including a reader to read a document, an input unit to receive an authenticator to make a copy of the read document, and an output unit configured to determine a result of whether the authenticator is equal to an authentication mark on the security document, and copy the security document in one or more ways according to the determined result.

The output unit of the system may be further configured to print the security document in one or more ways according to the determined result.

The foregoing and/or other aspects and utilities of the general inventive concept may also be achieved by providing a method of controlling a printing system of a security document, the method including reading a document with a reader, and determining a printing process according to an authentication mark of the read document and a reference authenticator.

The printing process of the method may further include one of a first printing process to print the read document, a second printing process to print an image different from the read document, and a third printing process not to print the read document.

The foregoing and/or other aspects and utilities of the general inventive concept may also be achieved by providing a method of controlling a printing system of a security document, the method including reading a document with a reader, receiving an authenticator to make a copy of the read document, and determining a result of whether the authenticator is equal to an authentication mark on the security document, and copying the security document in one or more ways according to the determined result.

The method may further include printing the security document in one or more ways according to the determined result.

The foregoing and/or other aspects and utilities of the general inventive concept may also be achieved by providing a method of controlling distribution of a security document, including receiving an authenticator to copy the security document, determining a result of whether the authenticator is equal to an authentication mark on the security document, and copying the security document in one or more ways according to the determined result.

The method may further include printing the security document in one or more ways according to the determined result.

The method may further include generating a security identifier, and printing the security document and the generated security identifier when the determined result is that the authenticator is equal to the authentication mark.

The method may further include generating a security identifier, masking the generated security identifier when the determined result is that the authenticator is not equal to the authentication mark, and printing the security document and the masked security identifier.

The foregoing and/or other aspects and utilities of the general inventive concept may also be achieved by providing a computer readable medium having recorded thereon a program to implement a method of controlling distribution of a security document, the method including receiving an authenticator to copy the security document, determining a result of whether the authenticator is equal to an authentication mark on the security document, and copying the security document in one or more ways according to the determined result.

The foregoing and/or other aspects and utilities of the general inventive concept may also be achieved by providing a method of controlling a printing system of a security document, the method including generating an authentication mark corresponding to a first authenticator, displaying the authentication mark on the security document while the security document is printed, confirming the authenticator by reading the authentication mark while the security document is copied, receiving a second authenticator, and comparing the first authenticator with the second authenticator, and preventing the security document from being printed when the first authenticator is not equal to the second authenticator.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
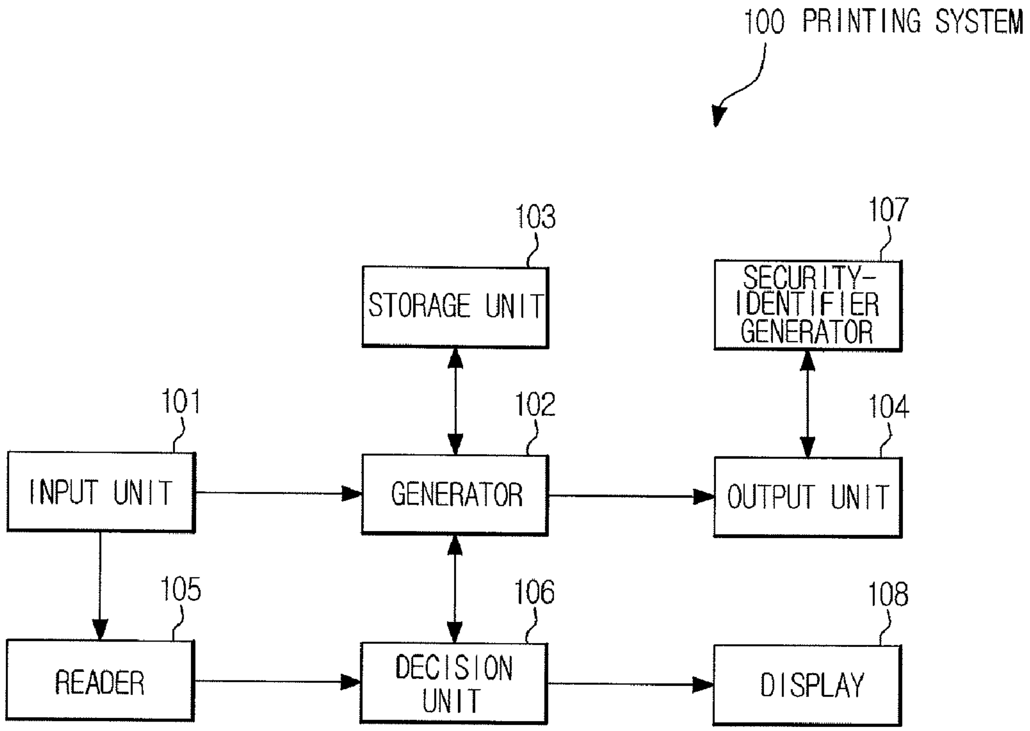
FIG. 1 is a block diagram illustrating a printing system of a security document according to an embodiment of the present general inventive concept.

Reference will now be made in detail to the embodiments of the present general inventive concept, examples of which are illustrated in the accompanying drawings, wherein like reference numerals refer to like elements throughout. The embodiments are described below to explain the present general inventive concept by referring to the figures.

Referring to FIG. 1, a printing system 100 for a security document according to an embodiment of the present general inventive concept includes an input unit 101, a generator 101, a storage unit 103, an output unit 104, a reader 105, a decision unit 106, a security-identifier generator 107, and a display 108. The input unit 101 may communicate with an external device to receive an authenticator through a wired or wireless communication, or may be a user interface to receive the authenticator from a user through a memory or an input tool for the authenticator.

If an original document of the security document is printed, the input unit 101 receives an authenticator from, for example, an administrator.

In this exemplary case, the administrator is indicative of a responsible person in charge of the security document. The authenticator includes one or more types of an administrator's permission information, for example, a signature, seal, or fingerprint of the administrator, or any combination thereof. However, the permission information is not limited thereto. Any suitable information to determine the level of the security document may also be used as the authenticator.

The input unit 101 receives the signature, seal or fingerprint of the administrator, any other suitable information, or any combination thereof.

The generator 102 generates an authentication mark to correspond to the authenticator entered by the administrator.

In more detail, the generator 102 converts a series of information into a barcode type on the basis of the authenticator information received from the input unit 101, and generates an image-type barcode capable of being inserted into a document. The authenticator may be converted into a barcode-type authentication mark to encode a particular code by the combination of a black bar and a white bar, so that the particular code can be read. In more detail, the black bar and the white bar are specifically arranged so that they are indicative of bits of 0 and 1. The bits of 0 and 1 may be read in order to determine the information.

The storage unit 103 stores the authenticator entered by the input unit 101 and the authentication mark to correspond to the authenticator.

The storage unit 103 may be composed of a storage medium to store an authentication mark (e.g., a barcode, or barcode-type mark). For example, the storage unit 103 may be a DRAM, an SDRAM, an SDRAM, an RDRAM, a DDRAM, or an SRAM, or any other suitable digital storage medium.

The output unit 104 displays an authentication mark on the security document when the security document is printed.

Figure 2:
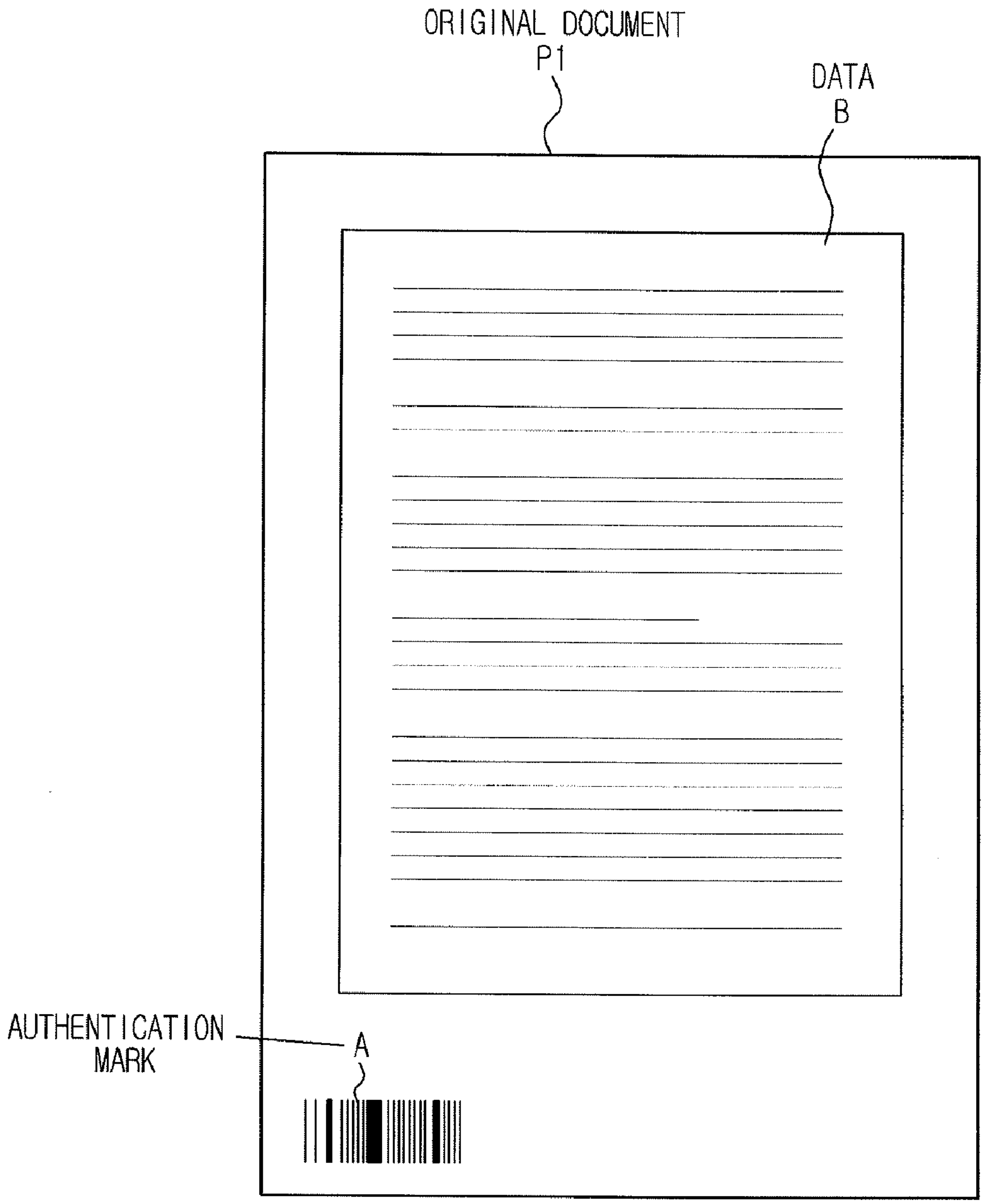
FIG. 2 exemplarily illustrates an original security document on which an authentication mark is displayed by an output unit of FIG. 1 according to the present general inventive concept.

FIG. 2 exemplarily illustrates an original document of a security document on which an authentication mark is displayed by the output unit of FIG. 1 according to the present general inventive concept. Referring to FIGS. 1 and 2, the output unit 104 retrieves the authentication mark A stored in the storage unit 103, and controls the retrieved authentication mark A and the data B of the security document to be simultaneously or successively printed.

As described above, the security document printed along with the authentication mark A is called an original document P1. The reader 105 reads the authenticator and the authentication mark displayed on the security document, so that it can prevent the original document P1 of the security document from being illegally copied or inappropriately copied (i.e., without authorization or permission, etc.), and normally copies the security document.

The reader 105 optically reads the characters, such as the authentication mark (A) printed on the document, using a reading medium such as an optical character reader (OCR). For example, the reader 105 may divide a single character into a plurality of squares, and reads the character on the basis of either black-and-white characteristics of a specific square or characteristics of the character-stroke shape.

The decision unit 106 confirms whether the authenticator corresponds to the read authentication mark.

The decision unit 106 checks the authenticator corresponding to the authentication mark using the authenticator and the authentication mark stored in the storage unit 103. If the authentication mark read by the reader 105 is denoted by the sequence of, for example, "1010," the decision unit 105 determines if the authenticator corresponding to the authentication mark of 1010 is stored in the storage unit 103, so that it confirms the authenticator.

The input unit 101 may again receive the authenticator from the administrator.

Figure 3:
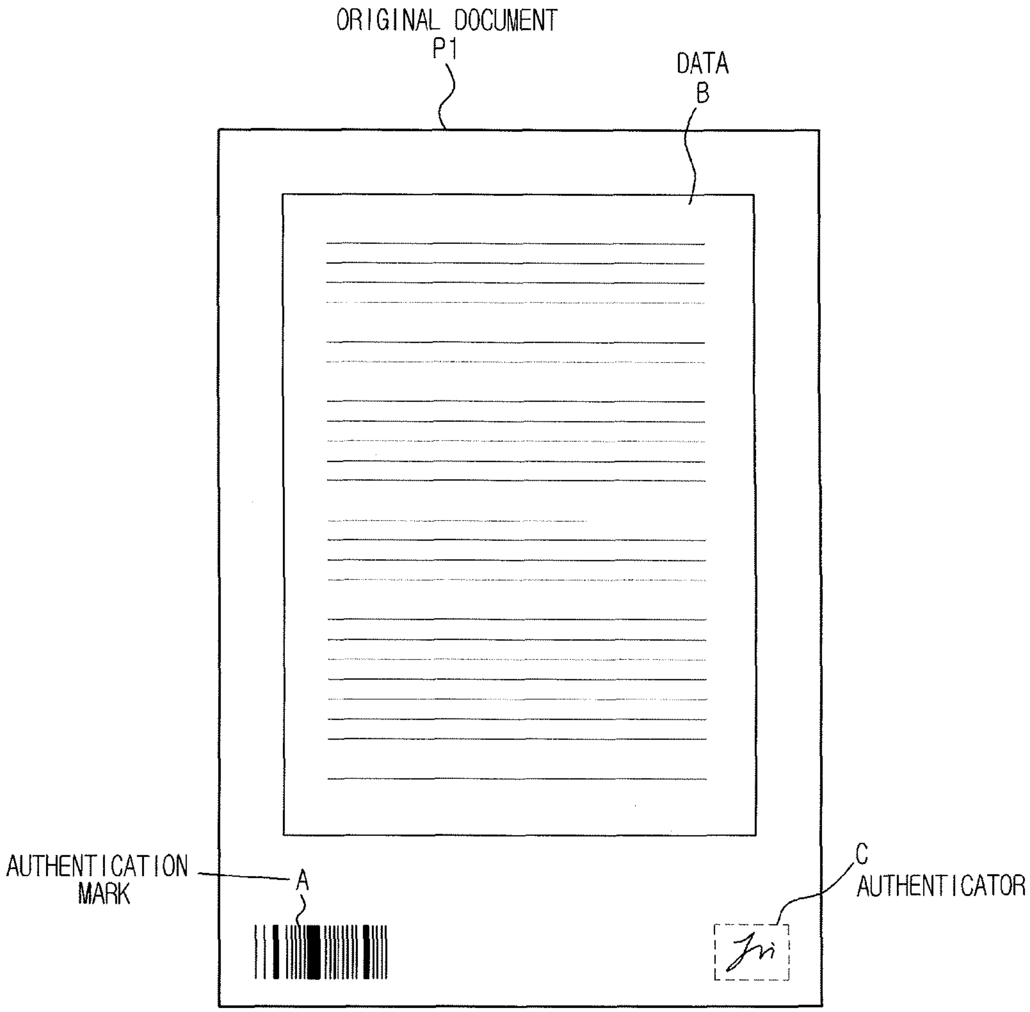
FIG. 3 exemplarily illustrates that an authenticator is inserted into the original document of the security document of FIG. 2 according to the present general inventive concept.

For example, as illustrated in FIG. 3, the administrator signs a signature on a predetermined location of the printed security document P1, and scans the signature, so that the administrator receives the authenticator (C).

The decision unit 106 may determine whether the authenticator is equal to the entry authenticator.

As described above, the decision unit 106 determines whether the confirmed authenticator is equal to the authenticator entered by the input unit 101. For example, the decision unit 106 may determine whether the black-and-white or character-stroke shape of the authenticator is equal to that of the authentication mark.

As described above, the decision unit 106 compares the same-type authenticators with each other, and can also compare the authenticator entered by the input unit 101 with the authentication mark read by the reader 105, so that it can determine whether the entry authenticator is equal to the read authentication mark.

For example, a barcode-type authentication mark may include binary data, and the decision unit 106 may acquire the same-type image as the authenticator, so that it can determine whether the entry authenticator is equal to the authentication mark using the authenticator and the authentication mark.

The security generator 107 generates the security identifier, and stores the generated security identifier.

In this case, the security identifier may be a watermark. This watermark is a representative copy protection technology for inserting a specific code or type preventing data from being illegally copied, and is composed of a character- or image-type. Watermarking technology and other related technologies may be applied to the present general inventive concept.

The security generator 107 can generate both a visible watermark and an invisible watermark. Besides this watermark, the security identifier can be generated in various ways as the authenticator or the authentication mark.

The output unit 104 prints the generated security identifier and the security document when the authenticators are equal to each other.

Figure 4:
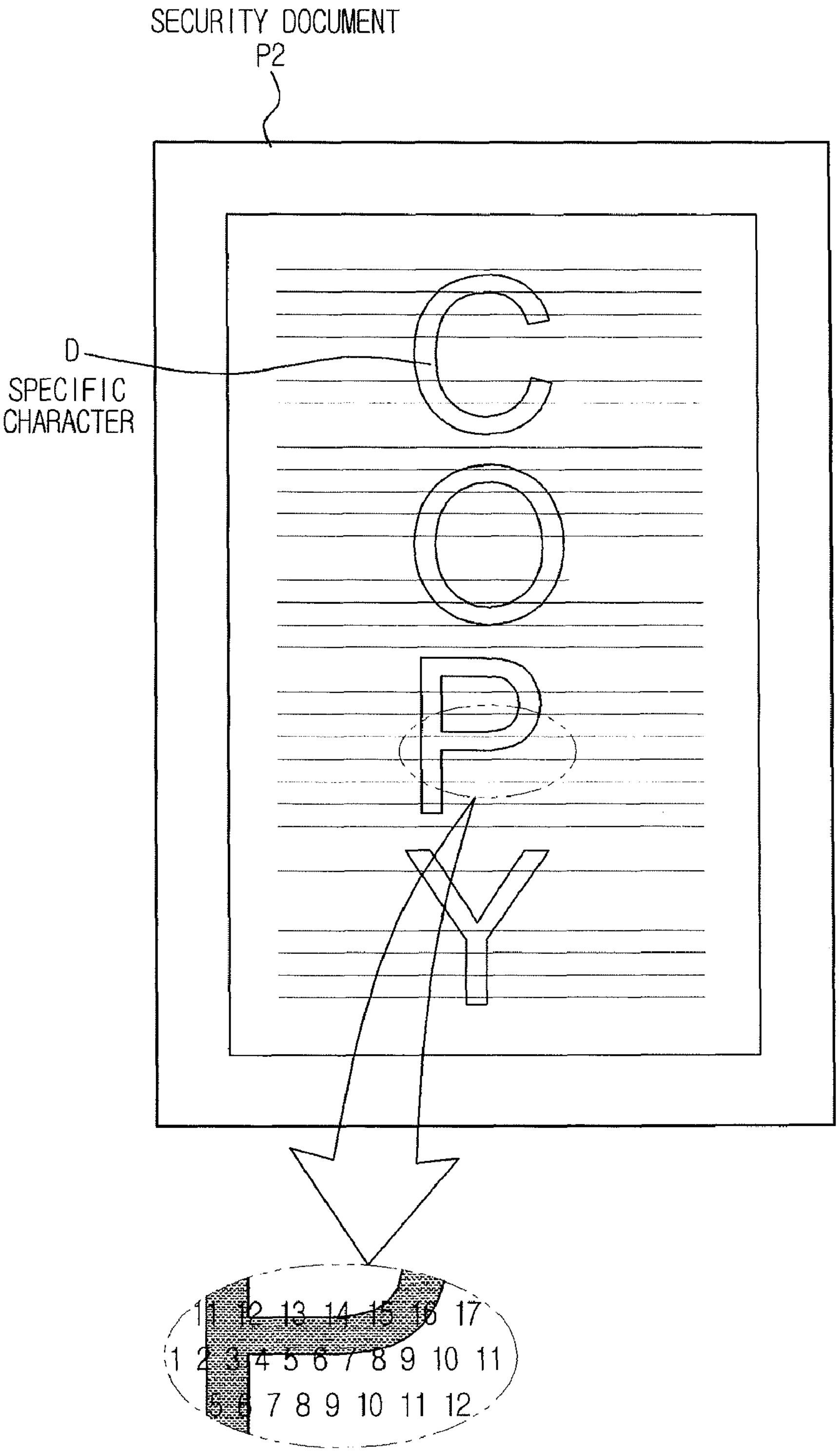
FIG. 4 exemplarily illustrates a duplicate copy of a security document printed along with a security identifier by the output unit of FIG. 1 according to the present general inventive concept.

FIG. 4 exemplarily illustrates a duplicate copy of a security document printed along with a security identifier by the output unit of FIG. 1 according to the present general inventive concept. Referring to FIG. 4, a specific character (D) used as a security identifier generated by the security generator 107 is inserted into the security document, and the duplicate copy of the security document is printed. By the security identifier (D) inserted into the security document (P2), it is determined that the security document has been legally printed or printed with authorization.

If the authenticators are equal to each other, the output unit 104 controls the security document such that it is not printed.

As described above, if the authenticators are equal to each other, the output unit 104 controls the security document not to be printed, so that the illegal copy or unauthorized copy of the unauthenticated security document is prevented from being copied and/or printed.

Figure 5:
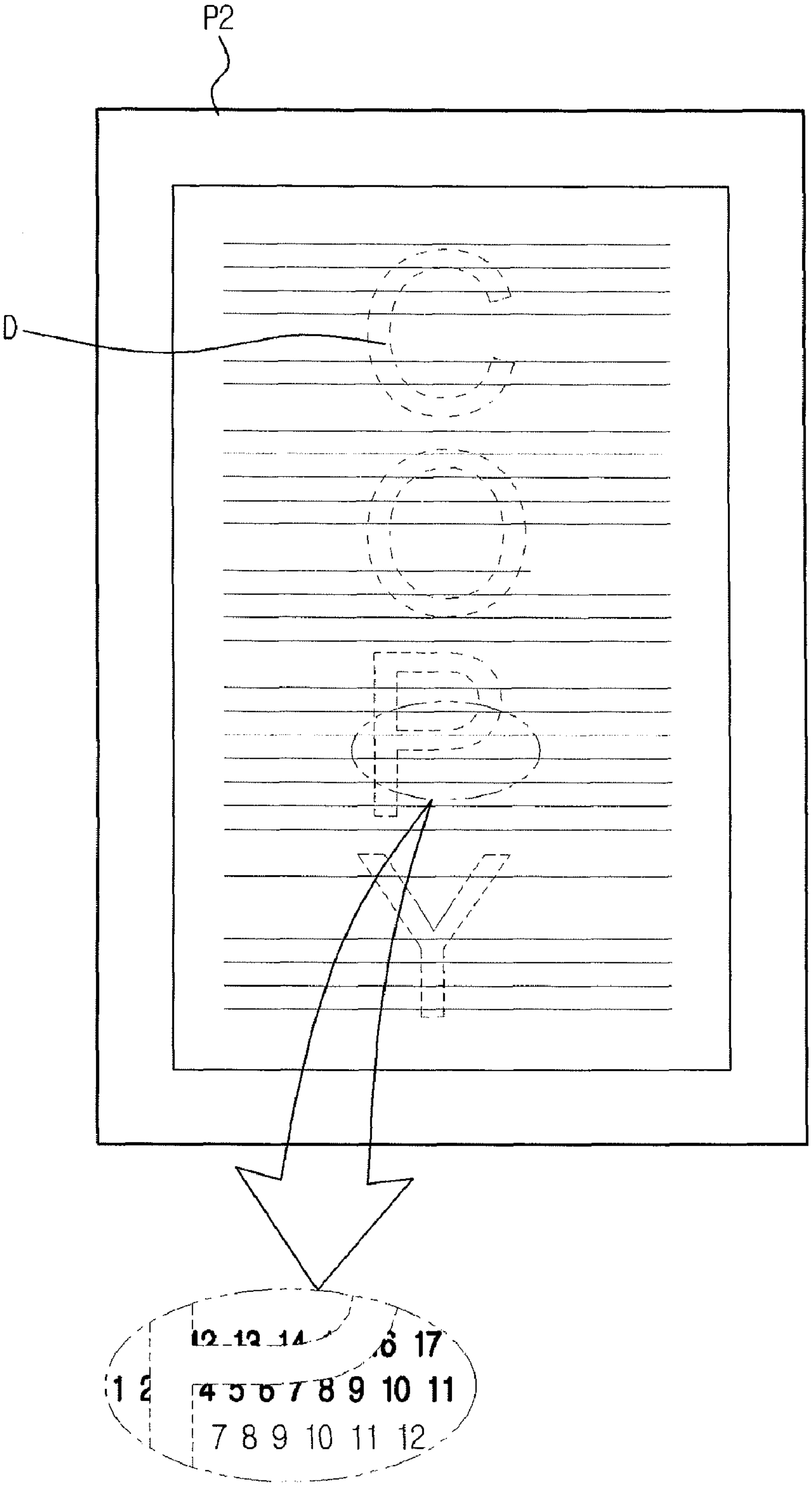
FIG. 5 exemplarily illustrates the duplicate copy of a security document including the masked security identifier as processed by the output unit of FIG. 1 according to the present general inventive concept.

If the authenticators are equal to each other, the output unit 104 controls the security identifier to be masking-processed and printed, so that it can be recognized that the corresponding document is an unauthenticated copy document FIG. 5 exemplarily illustrates a duplicate copy of a security document including the security identifier masking-processed by the output unit of FIG. 1 according to the present general inventive concept. Referring to FIG. 5, the output unit 104 masks the security identifier (D) if the authenticators are not equal to each other, and controls the printing of the masked result and the security document (P2). The output unit 104 may control the security identifier to be shown as a white blank, so that it can be recognized that the corresponding document is an unauthenticated document, and prevents the document from being illegally copied or from being copied without authorization.

Also, the output unit 104 controls the security identifier (D) to be shown as a black blank, so that it can be recognized that the corresponding document is an unauthenticated document.

In addition, when the original document of the security document is printed, a kernel technology of the security document is inserted into the security identifier. If the authenticators are not equal to each other, the security identifier is masked, so that the white blank is shown. As a result, the output unit 104 effectively prevents the kernel technology of the security document from being illegally printed or from being printed without authorization.

If the authenticators are not equal to each other, a non-allowance message indicating a non-allowance state of the security document is displayed on a display.

For example, if the authenticators are not equal to each other, the display 108 displays a non-allowance message (i.e., "The security document has not been authenticated, Please check again") on a display. The display 108 may be a display mounted to the printing system or a display connected to the printing apparatus via a communicative wired or wireless connection.

A method of controlling the printing system of the security document will hereinafter be described.

Figure 6:
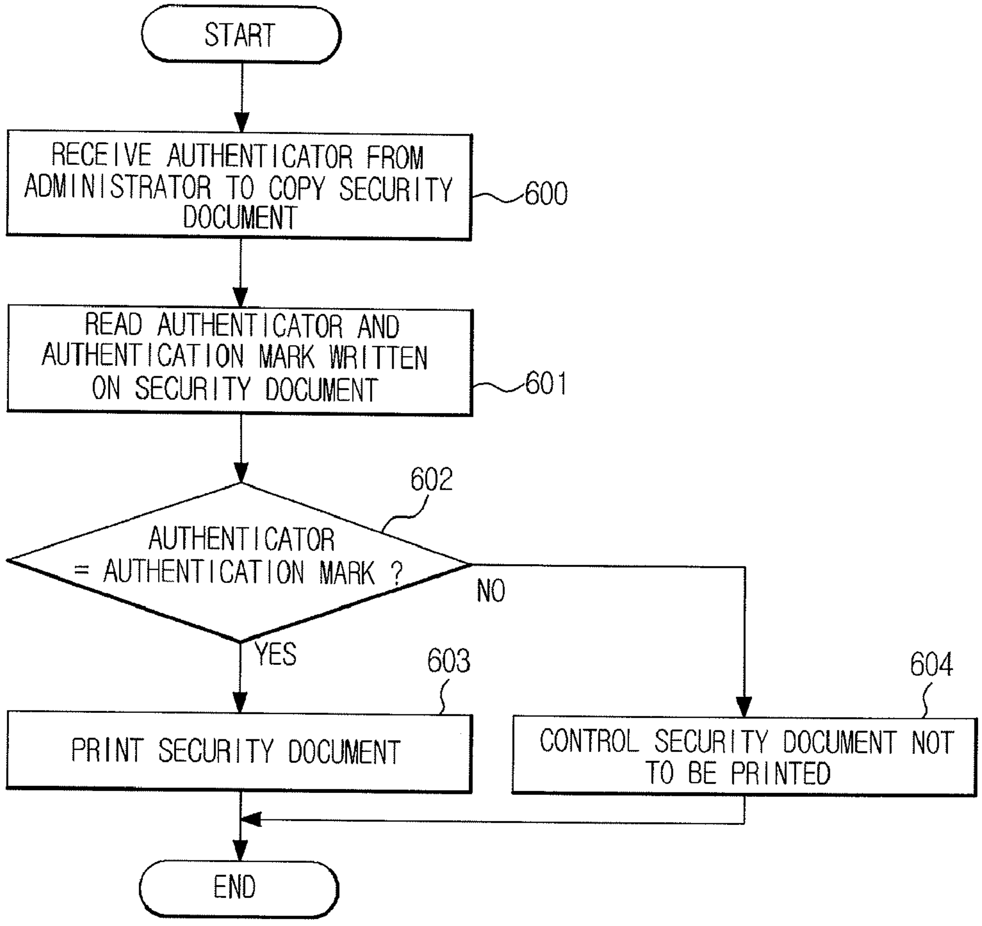
FIG. 6 is a flow chart illustrating a method of controlling the system to print the security document according to an embodiment of the present general inventive concept.

FIG. 6 is a flow chart illustrating a method of controlling the system to print the security document according to an embodiment of the present general inventive concept. Referring to FIGS. 1 and 6, the input unit 101 receives the authenticator from the administrator to copy the security document at operation 600.

For example, the input unit 101 may receive the signature, seal, or fingerprint of the administrator.

The reader 106 reads the authenticator and the authentication mark on the security document at operation 601.

The decision unit 106 determines whether the authenticator is equal to the authentication mark at operation 602. If the authenticator is equal to the authentication mark, the output unit 104 prints the security document at operation 603.

The output unit 104 prints a security identifier and the security document if the authenticator is equal to the authentication mark.

In this case, the security identifier may be a watermark. This watermark is a representative copy protection measure for inserting a specific code or type preventing data from being illegally or improperly copied (i.e., without authorization), and is composed of a character- or image-type.

If the authenticator is not equal to the authentication mark, the output unit 104 controls the security document not to be printed at operation 604.

If the authenticator is not equal to the authentication mark, the output unit 104 controls the security document not to be printed, so that it basically prevents the unauthenticated security document from being illegally copied or from being copied without authorization.

If the authenticator is not equal to the authentication mark, the display 108 displays a non-allowance message indicating a non-allowance state of the security document on a display.

In addition, if the authenticator is not equal to the authentication mark, the output unit 104 controls the masking-processed security identifier and the security document to be simultaneously printed, so that it can be recognized that the corresponding document is an unauthenticated document.

Figure 7:
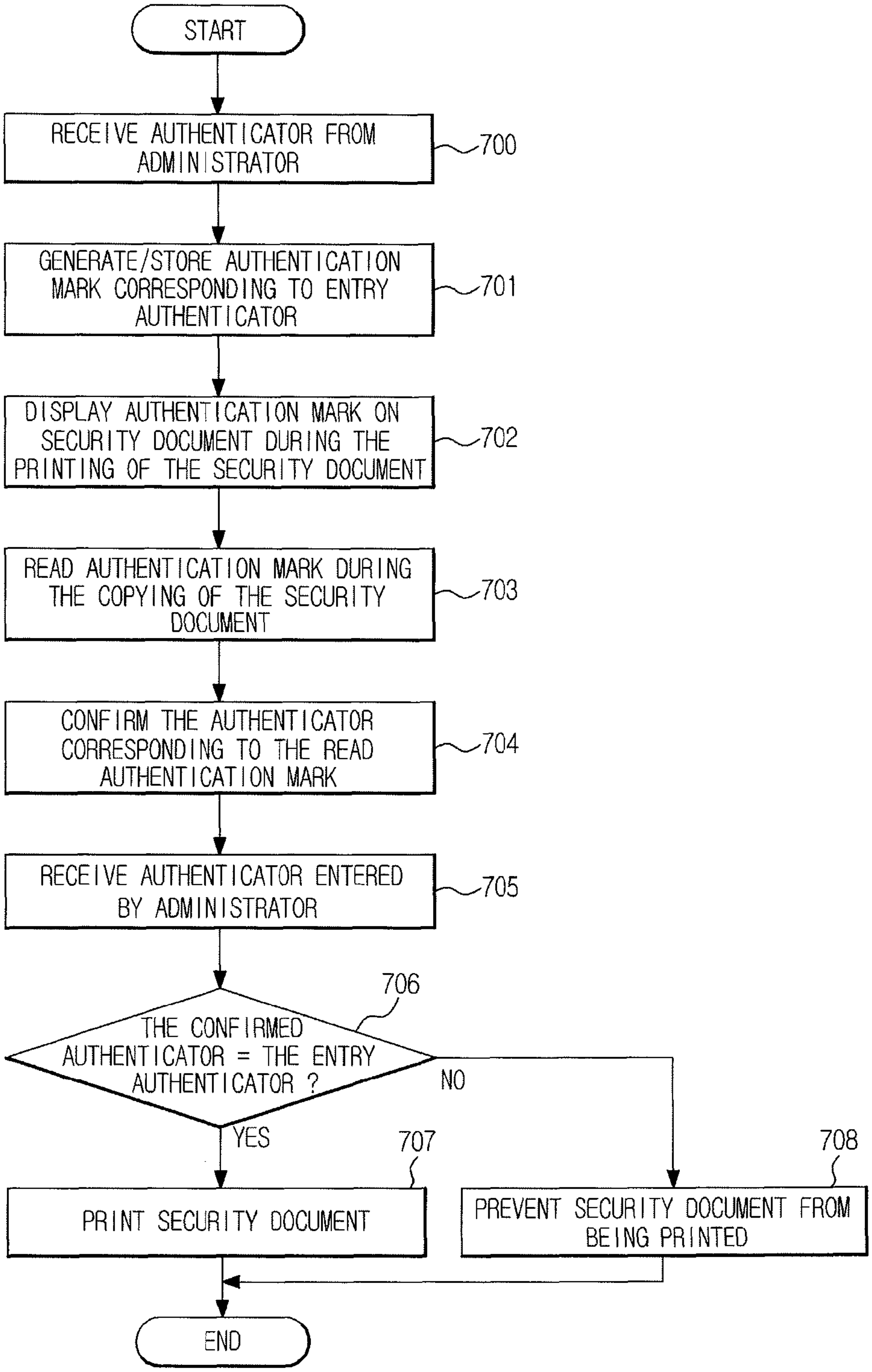
FIG. 7 is a flow chart illustrating a method of controlling the system to print the security document according to an embodiment of the present general inventive concept.

FIG. 7 is a flow chart illustrating a method of controlling the system to print the security document according to another embodiment of the present general inventive concept. Referring to FIGS. 1 and 7, the input unit 101 receives the authenticator from the administrator at operation 700.

The generator 102 generates the authentication mark corresponding to the entry authenticator, and stores the generated authentication mark at operation 701.

When the security document is printed, the output unit 104 displays the authentication mark on the security document at operation 702.

When the security document is copied, the reader 105 reads the authentication mark at operation 703, and the decision unit 106 confirms the authenticator corresponding to the read authentication mark at operation 704.

The input unit 101 receives again the authenticator (e.g., from the administrator) at operation 705.

The decision unit 106 determines whether the confirmed authenticator is equal to the entry authenticator at operation 706. If it is determined that the confirmed authenticator is equal to the entry authenticator at operation 706, the output unit 105 prints the security document at operation 707.

If the authenticators are equal to each other, the output unit 104 simultaneously or successively prints the pre-generated security identifier and the security document.

If the authenticators are not equal to each other at operation 706, the output unit 104 controls the security document not to be printed at operation 708.

If the authenticators are not equal to each other, the display 108 displays a non-allowance message indicating a non-allowance state of the security document on a display.

In addition, if the authenticators are not equal to each other, the output unit 104 controls the masking-processed security identifier and the security document to be simultaneously or successively printed, so that it can be recognized that the corresponding document is an unauthenticated copy document.

As is apparent from the above description, the printing system of a security document and a control method thereof according to the present general inventive concept can simplify a security procedure using an authentication process of the security administrator, and can effectively minimize or prevent the security document from being illegally copied or copied without authorization.

If the authentication of the security administrator is not conducted, the printing system controls the security document not to be printed. The printing system also controls the simultaneously printing of the masked security identifier and the security document, so that it can prevent the unauthenticated security document from being illegally copied or copied without authorization.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. A system to print a security document, the system comprising:

an input unit configured to receive an authenticator from an administrator to copy the security document;

a security-identifier generator to generate a security identifier according to the received authenticator that is received by the input unit from the administrator; and an output unit configured to determine a result of whether the authenticator is equal to an authentication mark on the security document, and copy the security document in one or more ways according to the determined result, and the output unit to print the security document along with the generated security identifier if the authenticator is equal to the authentication mark, and to mask the security identifier when the authenticator is not equal to the authentication mark and to print the masked security identifier along with the security document.

2. The system of claim 1, further comprising:

a decision unit configured to determine whether the authenticator is equal to the authentication mark on the security document.

3. The system of claim 2, further comprising:

a reader configured to read the authenticator and the authentication mark on the security document, wherein the decision unit is configured to determine whether the authenticator is equal to the authentication mark.

4. The system of claim 1, wherein the output unit is configured to print the security document if the authenticator is equal to the authentication mark.

5. The system of claim 1, further comprising:

a display configured to display a non-allowance message indicating a non-authentication state of the security document on a display if the authenticator is not equal to the authentication mark.

6. A system to print a security document comprising:

an input unit configured to receive an authenticator from an administrator to copy the security document;

a generator to generate a security identifier according to the received authenticator that is received by the input unit from the administrator; and an output unit configured to determine whether the authenticator is equal to an authentication mark on the security document, and the output unit to print the security document along with the generated security identifier if the authenticator is equal to the authentication mark, and to mask the security identifier when the authenticator is not equal to the authentication mark and to print the masked security identifier along with the security document.

7. The system of claim 6, further comprising:

a decision unit configured to determine whether the authenticator is equal to the authentication mark on the security document, wherein the output unit outputs the generated security identifier with the security document to be printed when the authenticator is equal to the authentication mark.

8. The system of claim 6, further comprising:

a display configured to display a non-allowance message indicating a non-authentication state of the security document on the display if the authenticator is not equal to the authentication mark.

9. A system to print a security document, the system comprising:

a generator configured to generate an authentication mark corresponding to a first authenticator from an administrator that is received by the generator from an input unit;

an output unit configured to display the authentication mark on the security document while the security document is printed;

a decision unit configured to confirm the first authenticator by reading the authentication mark while the security document is copied, receive a second authenticator, compare the first authenticator with the second authenticator, and determine a result of whether the first authenticator is equal to the second authenticator; and a security-identifier generator configured to generate a security identifier, wherein the output unit is further configured to print the security document in one or more ways according to the determined result, the output unit to print the security document along with the generated security identifier if the first authenticator is equal to the second authenticator, and to mask the security identifier when the first authenticator is not equal to the second authenticator.

10. The system of claim 9, further comprising:

a reader configured to read the authenticator and the authentication mark.

11. The system of claim 9, further comprising:

a storage unit configured to store the authenticator and the authentication mark corresponding to the authenticator.

12. The system of claim 9, wherein the authentication mark is configured in the form of a barcode.

13. The system of claim 9, wherein the output unit is configured to print the security document if the first authenticator is equal to the second authenticator.

14. The system of claim 9, further comprising:

a display configured to display a non-allowance message indicating a non-authentication state of the security document on a display when the first authenticator is not equal to the second authenticator.

15. A system to print a security document, the system comprising:

a generator configured to generate an authentication mark corresponding to a first authenticator that is received by the generator from an input unit that receives the first authenticator from an administrator;

an output unit configured to display the authentication mark on a security document while the security document is printed;

a decision unit configured to confirm the first authenticator by reading the authentication mark while the security document is copied, receive a second authenticator, compare the first authenticator with the second authenticator, and determine whether the first authenticator is equal to the second authenticator;

a security-identifier generator configured to generate a security identifier, and wherein the output unit is configured to print the security document along with the generated security identifier if the first authenticator is equal to the second authenticator, and to mask the security identifier when the first authenticator is not equal to the second authenticator.

16. The system of claim 15, further comprising:

a reader configured to read the authenticator and the authentication mark.

17. The system of claim 15, further comprising:

a storage unit configured to store the authenticator and the authentication mark corresponding to the authenticator.

18. The system of claim 15, wherein the authentication mark is configured in the form of a barcode.

19. The system of claim 15, further comprising:

a display configured to display a non-allowance message indicating a non-authentication state of the security document on a predetermined screen display when the first authenticator is not equal to the second authenticator.

20. A method of controlling a printing system of a security document, the method comprising:

receiving an authenticator from an administrator with an input unit of a printing system to copy the security document;

determining a result of whether the authenticator is equal to an authentication mark on the security document with at least an output unit of the printing system; and printing the security document with the output unit in one or more ways according to the determined result, and where the output unit prints the security document along with a generated security identifier if the authenticator is equal to the authentication mark, and masks the security identifier when the authenticator is not equal to the authentication mark and to print the masked security identifier along with the security document.

21. The method of claim 20, further comprising:

reading the authenticator and the authentication mark on the security document with a reader of the printing system after receiving the authenticator; and determining whether the authenticator is equal to the read authentication mark with a decision unit of the printing system.

22. The method of claim 21, further comprising:

if the authenticator is not equal to the authentication mark, preventing the security document from being printed with the output unit.

23. The method of claim 21, further comprising:

if the authenticator is not equal to the authentication mark, displaying a non-allowance message indicating a non-authentication state of the security document on a predetermined screen display.

24. A method of controlling a printing system of a security document, the method comprising:

generating an authentication mark corresponding to a first authenticator with a generator of the printing system, where the first authenticator is received by the generator from an input unit that receives the first authenticator from an administrator;

generating a security identifier with a security-identifier generator;

displaying the authentication mark with an output unit of the printing system on the security document while the security document is printed;

confirming the authenticator with a decision unit of the printing system by reading the authentication mark while the security document is copied, receiving a second authenticator, comparing the first authenticator with the second authenticator, and determining whether the first authenticator is equal to the second authenticator;

printing the security document with the output unit in one or more ways according to the determined result by printing the security document along with the generated security identifier if the first authenticator is equal to the second authenticator; and masking the security identifier when the first authenticator is not equal to the second authenticator.

25. The method of 24, further comprising:

after generating the authentication mark, storing the authenticator and the authentication mark corresponding to the authenticator with a storage unit of the printing system.

26. The method of claim 25, further comprising:

if the first authenticator is equal to the second authenticator, printing the security document with the output unit.

27. The method of claim 25, further comprising:

if the first authenticator is equal to the second authenticator, printing the security document along with a pre-stored security identifier with the output unit.

28. The method of claim 25, further comprising:

if the first authenticator is not equal to the second authenticator, preventing the security document from being printed with the output unit.

29. The method of claim 25, further comprising:

if the first authenticator is not equal to the second authenticator, displaying a non-allowance message indicating a non-authentication state of the security document on a display.

30. A method of controlling a printing system of a security document, the method comprising:

reading a document with a reader of the printing system;

receiving an authenticator from an administrator with an input unit of the printing system to make a copy of the read document;

generating a security identifier with a generator according to the authenticator received by the input unit from the administrator;

determining a result of whether the authenticator is equal to an authentication mark on the security document, and copying the security document with the generated security identifier in one or more ways according to the determined result with an output unit of the printing system;

printing the security document along with the generated security identifier with the output unit if the authenticator is equal to the authentication mark; and masking the security identifier with the output unit when the authenticator is not equal to the authentication mark and printing the masked security identifier along with the security document.

31. The method of claim 30, further comprising:

printing the security document with the output unit in one or more ways according to the determined result.

32. A method of controlling distribution of a security document, the method comprising:

receiving an authenticator from an administrator with an input unit of a security document distribution system to copy the security document;

generating a security identifier with a security-identifier generator according to the authenticator received from the input unit from the administrator;

determining a result of whether the authenticator is equal to an authentication mark on the security document with an output unit of the security document distribution system;

printing the security document along with the generated security identifier with the output unit if the authenticator is equal to the authentication mark;

masking the security identifier when the authenticator is not equal to the authentication mark and printing the masked security identifier along with the security document; and copying the security document with the output unit in one or more ways according to the determined result.

33. The method of claim 32, further comprising:

printing the security document with the output unit in one or more ways according to the determined result.

34. The method of claim 32, further comprising:

printing the security document and the generated security identifier with the output unit when the determined result is that the authenticator is equal to the authentication mark.

35. The method of claim 32, further comprising:

masking the generated security identifier with the output unit when the determined result is that the authenticator is not equal to the authentication mark; and printing the security document and the masked security identifier with the output unit.

36. A non-transitory computer readable medium having recorded thereon a program to implement a method of controlling distribution of a security document, the method comprising:

receiving an authenticator from an administrator with an input unit to copy the security document;

generating a security identifier with a security-identifier generator according to the authenticator received by the input unit from the administrator;

determining a result of whether the authenticator is equal to an authentication mark on the security document;

printing the security document along with the generated security identifier if the authenticator is equal to the authentication mark;

masking the security identifier when the authenticator is not equal to the authentication mark and printing the masked security identifier along with the security document; and copying the security document with the generated security identifier in one or more ways according to the determined result.

37. A method of controlling a printing system of a security document, the method comprising:

generating an authentication mark corresponding to a first authenticator with a generator of the printing system, where the first authenticator is received by the generator from an input unit that receives the first authenticator from an administrator;

generating a security identifier with a security-identifier generator;

displaying the authentication mark on the security document while the security document is printed with an output unit of the printing system;

confirming the authenticator by reading the authentication mark with a reader of the printing system while the security document is copied, receiving a second authenticator, and comparing the first authenticator with the second authenticator with a decision unit of the printing system;

printing the security document along with the generated security identifier if the first authenticator is equal to the second authenticator; and masking the security identifier when the first authenticator is not equal to the second authenticator.

* * * * *